United States Patent
Schambre et al.

(12) 
(10) Patent No.: US 6,758,527 B2
(45) Date of Patent: Jul. 6, 2004

(54) HEADREST RETRACTABLE AGAINST MOTOR VEHICLE HEADLINER

(75) Inventors: John E Schambre, Canton, MI (US); Rudi Krajcirovic, Royal Oak, MI (US); Marcus G Washington, Southfield, MI (US); Michael O Forker, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/146,157

(22) Filed: May 15, 2002

(65) Prior Publication Data

US 2003/0214145 A1 Nov. 20, 2003

(51) Int. Cl.[7] ................................................. A47C 1/10
(52) U.S. Cl. ....................................... 297/395; 280/751
(58) Field of Search ................................ 297/391, 395, 297/394, 408; 280/748, 751, 214, 97.11; 296/187.05

(56) References Cited

U.S. PATENT DOCUMENTS

| | | | |
|---|---|---|---|
| 2,649,142 A | * | 8/1953 | New |
| 3,188,112 A | * | 6/1965 | Oelkrug |
| 3,310,342 A | * | 3/1967 | Drelichowski |
| 3,964,788 A | * | 6/1976 | Kmetyko |
| 4,190,291 A | | 2/1980 | Yamamoto et al. |
| 4,249,754 A | * | 2/1981 | Best ........................... 280/751 |
| 4,458,919 A | * | 7/1984 | Kawashima et al. ........ 280/751 |
| 4,576,413 A | | 3/1986 | Hatta |
| 4,623,166 A | | 11/1986 | Andres et al. |
| 4,711,494 A | | 12/1987 | Duvenkamp |
| 4,762,367 A | | 8/1988 | Denton |
| 4,822,102 A | | 4/1989 | Duvenkamp |
| 5,011,225 A | | 4/1991 | Nemoto |
| 5,145,233 A | | 9/1992 | Nagashima |
| 5,295,711 A | * | 3/1994 | Huan .......................... 280/751 |
| 5,669,668 A | | 9/1997 | Leuchtmann |
| 5,752,742 A | | 5/1998 | Kerner et al. |
| 5,918,940 A | | 7/1999 | Wakamatsu et al. |
| 6,074,010 A | | 6/2000 | Takeda |
| 6,113,192 A | | 9/2000 | Schneider |
| 6,129,421 A | | 10/2000 | Gilson et al. |
| 6,192,565 B1 | | 2/2001 | Tame |
| 6,290,298 B1 | | 9/2001 | Lee |
| 6,299,254 B1 | | 10/2001 | Dinh et al. |
| 6,302,485 B1 | | 10/2001 | Nakane et al. |

* cited by examiner

*Primary Examiner*—Peter M. Cuomo
*Assistant Examiner*—Stephen Vu
(74) *Attorney, Agent, or Firm*—Donald J. Wallace

(57) ABSTRACT

A headrest assembly comprises a headrest pivotable from a first position to a second position. In the first position, the headrest is generally proximate a seatback of the motor vehicle. In the second position, the headrest is generally proximate a headliner of the motor vehicle.

9 Claims, 3 Drawing Sheets

HEADREST RETRACTABLE AGAINST MOTOR VEHICLE HEADLINER

TECHNICAL FIELD OF THE INVENTION

This invention relates generally to headrests for motor vehicle seats, and relates more specifically to a headrest that is retractable into a headliner of the vehicle.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage. Typically, locking mechanisms are provided for holding the seat in the seating configuration, and the locking mechanisms can be released to permit moving the seat to the load floor configuration.

Various arrangements have been proposed for retracting a headrest of the seat in order to provide the seat with a more compact profile when folded. For example, U.S. Pat. No. 5,918,940 shows several embodiments of a seat having an adjusting mechanism for adjusting the height of a headrest according to the pivoting of a seatback relative to a seat cushion.

SUMMARY OF THE INVENTION

The present invention is a headrest assembly for a motor vehicle. The headrest assembly comprises a headrest pivotable from a first position to a second position. In the first position, the headrest is generally proximate a seatback of the motor vehicle. In the second position, the headrest is generally proximate a headliner of the motor vehicle.

Accordingly, it is an object of the present invention to provide an assembly of the type described above in which the headrest is separated from a seatback.

Another object of the present invention is to provide an assembly of the type described above that allows the seatback to be more easily stowed inside or outside of the vehicle.

Still another object of the present invention is to provide an assembly of the type described above that may be operated either manually or automatically.

Yet another object of the present invention is to provide an assembly of the type described above which is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
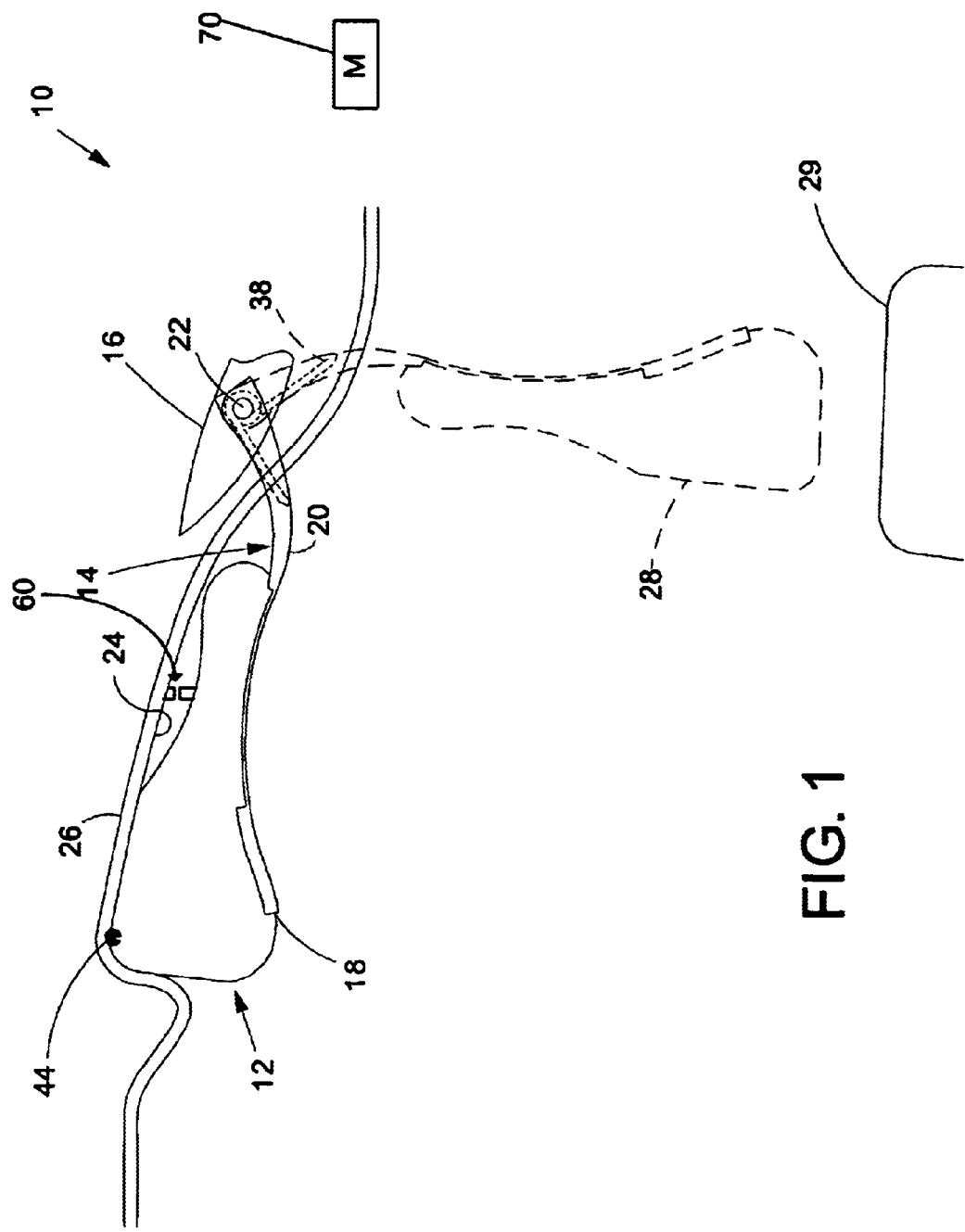
FIG. 1 is a cross-sectional view of headrest assembly according to the present invention for a motor vehicle seat.

FIG. 1 shows one embodiment of a headrest assembly 10 according to the present invention for a motor vehicle seat. The headrest assembly 10 includes a padded headrest 12, an arm 14, and a mounting bracket 16 attached to a roof rail of the vehicle. The headrest 12 may be of any conventional construction, such as a covered urethane pad over a plastic substrate. The substrate is attached, again by any conventional means such as mechanical fasteners or an adhesive, to a free end 18 of the arm 14. An opposite end 20 of the arm 14 is pivotably mounted, preferably by a pin 22, to the mounting bracket 16.

The headrest 12 is adapted to move between a retracted position and a deployed position shown in phantom. In the retracted position, the headrest 12 is preferably disposed in an indentation 24 in a headliner 26 of the motor vehicle. The indentation 24 is desirably contoured so as to closely match a front surface 28 of the headrest 12 in order to achieve the smallest possible packaging size. The headrest 12 in the deployed position is spaced above a conventional seatback 29 and adapted to support a head of the operator of the vehicle.

Figure 2:
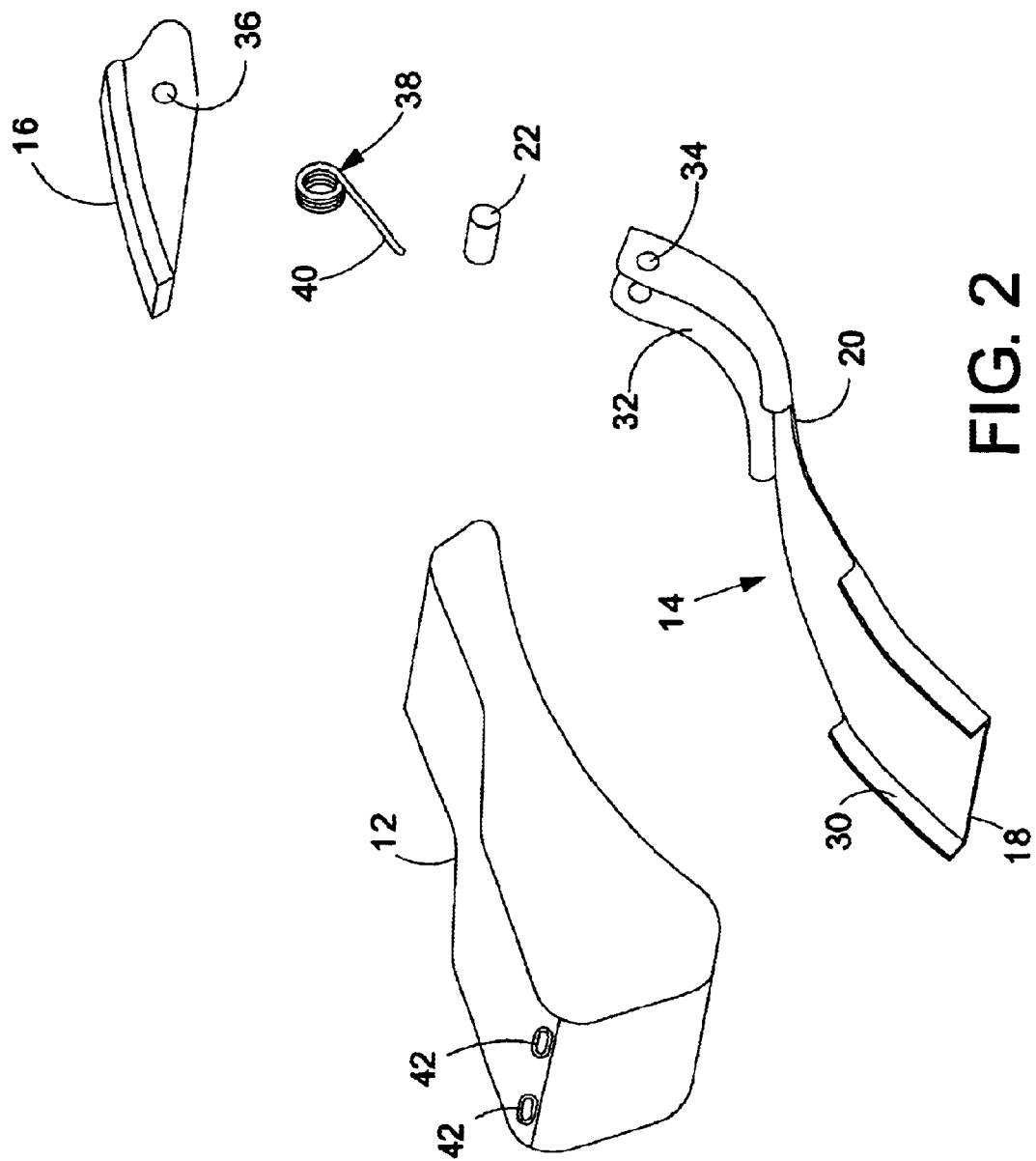
FIG. 2 is an exploded perspective view of the headrest assembly shown in FIG. 1.

As FIG. 2 shows, the free end 18 of the arm 14 is preferably relatively wide and includes opposed flanges 30 to supporting the lower, lateral portions of the headrest 12. The upper end 20 of the arm may also be provided with similar flanges 32, depending upon the degree of lateral support necessary to secure the headrest 12 on the arm 14. The flanges 32 each include an aperture 34 through which the pin 22 extends in order to secure the arm 14 to the mounting bracket 16. In a preferred embodiment, the mounting bracket 16 includes apertures 36 through which the pin 22 may extend and be secured by means such as conventional retainer clips (not shown). In this arrangement, the pin 22 is free to rotate. The pin 22 may of course be welded or otherwise secured against rotation relative to the mounting bracket 16 in certain applications.

A coil spring 38 rides on the pin 22, and includes an extension 40. The coil portion of the spring 38 is preferably fixed for rotation with the pin 22 so that the extension 40, which bears against the end 20 of the arm 14, continually exerts a force biasing the headrest toward the use position. In order to latch the headrest proximate the headliner 26, the headrest 12 is provided with a pair of spaced pins 42. The pins 42 are adapted to selectively engage a pair of corresponding catches 44 mounted in the headliner, as shown in FIG. 1. Alternatively, the headrest and headliner can be provided with one or more appropriate magnetic elements 60 to afford selective securement of the headrest in the indentation 24. Another catch (not shown) may be provided on or near the mounting bracket 16 to retain the headrest 12 in the use position.

Figure 3:
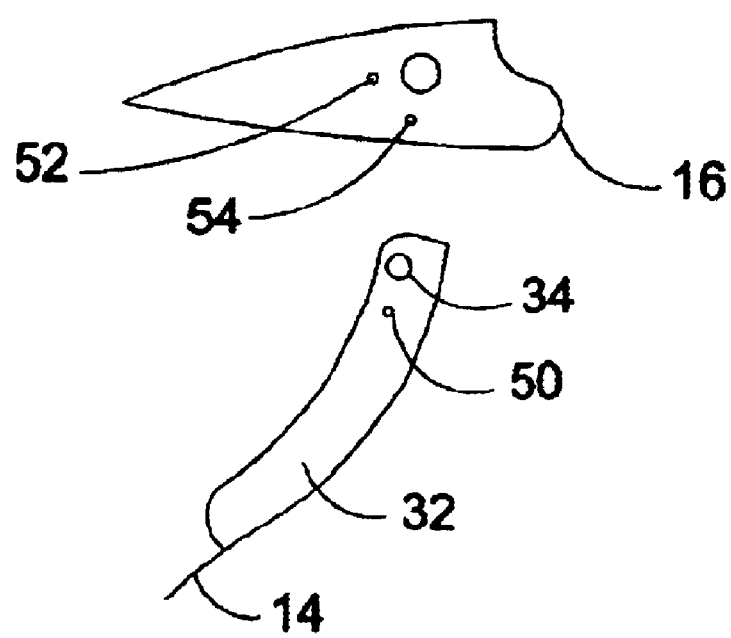
FIG. 3 is an exploded perspective view of an alternative embodiment of the headrest assembly.

FIG. 3 shows an alternative embodiment of the headrest assembly in which the arm 14 is provided with a spring-loaded ball bearing 50 in each of the flanges 32. The ball bearings 50 are adapted to selectively engage holes 52 in the mounting bracket to retain the headrest in the stowed position, and to selectively engage holes 54 in the mounting bracket to retain the headrest in the use position.

The present invention thus provides a headrest assembly that, by virtue of its physical separation from the seatback 29, allows the seatback to be more easily stowed inside or outside of the vehicle. While the headrest is preferably manually operated as described above, the present invention also contemplates that the headrest may be powered between the retracted and deployed positions by means such as an electric motor 70.

While the embodiment of the invention disclosed herein is presently considered to be preferred, various chtnges and modifications can be made without departing from the spirit and scope of the invention. The scope of the invention is indicated in the appended claims, and all changes that come within the meaning and range of equivalents are intended to be embraced therein.

What is claimed is:

1. In combination with a and a motor vehicle having a seatback and a headliner, the headrest assembly comprising:

a headrest for supporting a vehicle occupant's head;

an arm connected to the headrest and comprising a plurality of flanges for supporting opposing side portions of the headrest; and a mounting bracket mounted in the headliner and pivotally connected to the arm;

the headrest being pivotable from a first position proximate the seatback to a second position proximate the headliner.

2. The headrest assembly of claim 1 further comprising means for latching the headrest in the first position.

3. The headrest assembly of claim 1 further comprising means for latching the headrest in the second position.

4. The headrest assembly of claim 3, wherein the means for latching comprises a magnetic element.

5. The headrest and motor vehicle of claim 1, further comprising an electric motor mechanism for driving the headrest from the first position to the second position.

6. The headrest and motor vehicle of claim 5 wherein the headliner comprises an indentation for receiving the headrest in the second position.

7. The headrest and motor vehicle of claim 1, wherein the headliner comprises an indentation for receiving the headrest in the second position.

8. The headrest assembly of claim 7, further comprising a magnetic element for retaining the headrest in the second position.

9. The headrest assmembly of claim 1, wherein the arm further comprises a spring-loaded ball bearing adapted to selectively engage one of a plurality of holes in the mounting bracket to retain the headrest in one of the first and second positions.

* * * * *